UNITED STATES PATENT OFFICE.

EDUARD ULLRICH, OF HÖCHST-ON-THE-MAIN, ASSIGNOR TO CARL ROTH, OF BERLIN, AND THE FARBWERKE, VORMALS MEISTER, LUCIUS & BRÜNING, OF HÖCHST-ON-THE-MAIN, GERMANY.

PRODUCTION OF DIETHYLMETHYLTHIONIN-BLUE.

SPECIFICATION forming part of Letters Patent No. 366,640, dated July 12, 1887.

Application filed January 13, 1887. Serial No. 224,253. (No specimens.) Patented in France December 24, 1885, No. 173,137; in Germany December 25, 1885, No. 38,573, and in England January 1, 1886, No. 43.

*To all whom it may concern:*

Be it known that I, EDUARD ULLRICH, doctor of philosophy, a citizen of the Empire of Germany, residing at Höchst-on-the-Main, in the Empire of Germany, have invented certain new and useful Improvements in Diethylmethylthionin-Blue; and I do hereby declare the following to be a full, clear, and exact description of the invention, such as will enable others skilled in the art to which it appertains to make and use the same.

This invention relates to a blue coloring-matter or dye-stuff, which I term "diethylmethylthionin-blue," the hydrochlorate of diethylmethylthionin

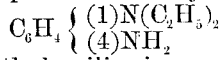

being an essential constituent of the same. This blue coloring-matter I produce by joint oxidation of paramido-diethylaniline $$C_6H_4 \begin{cases} (1)N(C_2H_5)_2 \\ (4)NH_2 \end{cases}$$

and monomethyl-aniline in presence of a hyposulphite, and precipitating the coloring-matter from its solution by means of chloride of zinc and common salt.

According to the said invention, fifteen parts of diethylaniline are dissolved in diluted hydrochloric acid (forty parts of water and sixty-five parts of concentrated hydrochloric acid) and then by seven and one-tenths parts of nitrite of sodium, and subsequent addition of zinc converted into amido-diethylaniline. Zinc is added in the quantity necessary to use up all the free hydrochloric acid. The solution thus obtained is diluted with water to about five hundred parts, and then are added fourteen parts of hydrochlorate of monomethylaniline and twenty-five parts of hyposulphite of sodium. Now I oxidize by adding a solution of twenty-five parts of potassium dichromate, boil for about two hours, add the quantity of sulphuric acid necessary to bind the chromoxide and the alkalies, and expel the sulphurous acid by further boiling. Then the dissolved leuco compound is converted into the coloring-matter by the addition of an oxidizing agent, and finally it is precipitated by means of common salt.

The coloring-matter is a brown powder of bronze-like appearance. The blue solution of the same is easily reduced to a colorless liquid, the original shade of which is restored by oxidizing agents. By means of tannin and emetic tartar the coloring-matter is fixed on the fiber so that it will resist washing. Quicksilver chloride and potassium dichromate precipitate the solution. The precipitate is of a dark-blue shade.

What I claim as new, and desire to secure by Letters Patent, is—

As a new product, diethylmethylthionin-blue produced by joint oxidation of paramido-diethylaniline and monomethyl-aniline in presence of a hyposulphite, and having the characteristics above set forth.

In testimony whereof I affix my signature in presence of two witnesses.

EDUARD ULLRICH.

Witnesses:
  JEAN GRUND,
  JACOB MUELLER.